Sept. 20, 1938.  E. E. HEWITT  2,130,622
ELECTRIC BRAKE MEANS
Original Filed Jan. 13, 1937
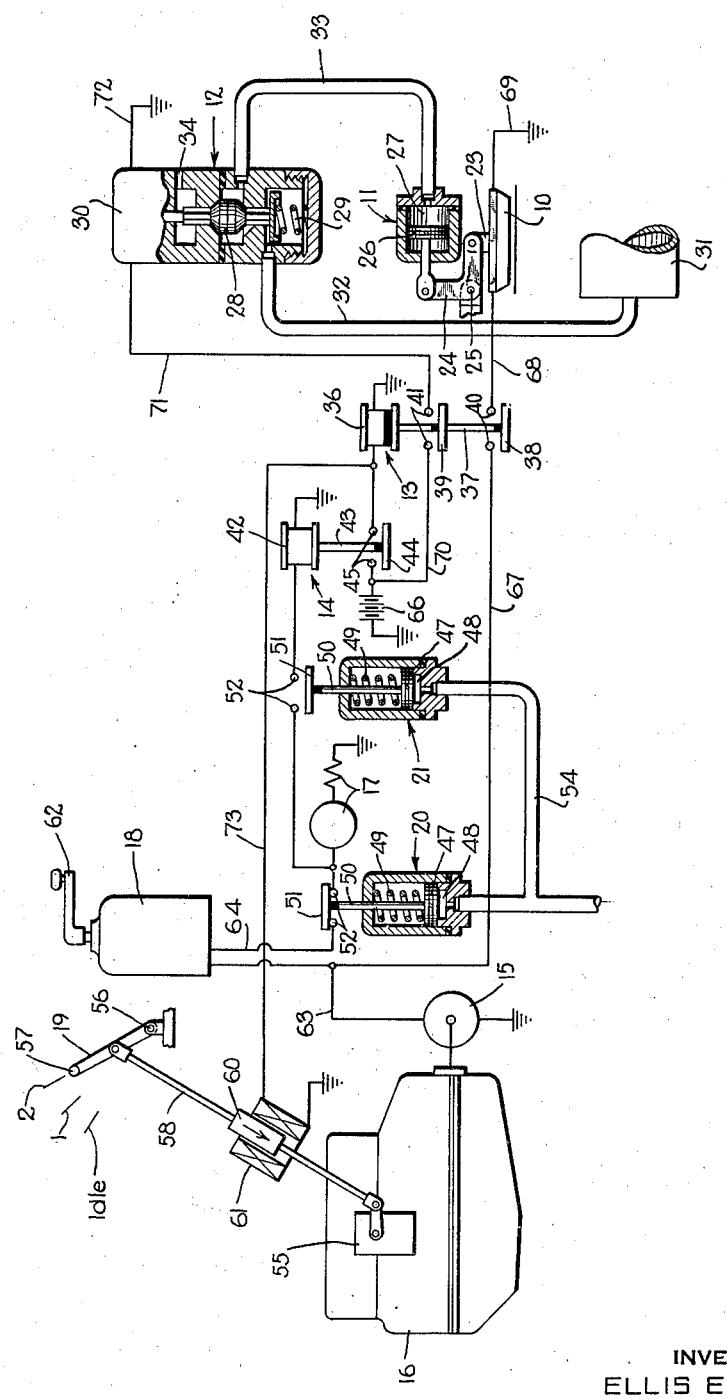
INVENTOR
ELLIS E. HEWITT
BY *Wm. M. Cady*
ATTORNEY Patented Sept. 20, 1938

2,130,622

UNITED STATES PATENT OFFICE 2,130,622

ELECTRIC BRAKE MEANS

Ellis E. Hewitt, Edgewood, Pa., assignor to The Westinghouse Air Brake Company, Wilmerding, Pa., a corporation of Pennsylvania Original application January 13, 1937, Serial No. 120,385. Divided and this application July 16, 1937, Serial No. 153,911

12 Claims. (Cl. 192—3)

This invention relates to electric brake means, and more particularly to means for controlling a magnetic track brake in relation to a fluid pressure brake. This application is a division of my copending application Serial No. 120,385, filed January 13, 1937, for Magnetic brake control.

With the advent of trains operating at unusually high speeds, as for example in the neighborhood of one hundred miles per hour or more, the problem of stopping such trains in short distances becomes of first importance. The fundamental brake for such trains is the familiar fluid pressure operated type of brake. As is well understood, this brake comprises brake shoes operating upon the treads of the vehicle wheels.

Due to the fact that the coefficient of friction between the brake shoes and the wheel treads is relatively low at high vehicle speeds and relatively high at low vehicle speeds, the braking force with which the brakes are initially applied is not as effective at the high speeds as at the low speeds. As a consequence, some difficulty may be experienced in obtaining the necessary braking at the high speeds. Moreover, if the brakes are applied to the maximum degree at a high speed, then as the speed of the vehicle diminishes and the coefficient of friction between the brake shoes and wheel treads increases, the braking force must be reduced or otherwise wheel sliding may result.

In order to provide for adequate braking at the high speeds, it has heretofore been proposed to provide magnetic track brakes to augment the fluid pressure brakes. However, when making ordinary or service stops the fluid pressure brakes will in most cases be adequate, but in emergency cases, as when applying the brakes to avoid collision, additional braking may be required. It is, therefore, desirable that where magnetic track brakes are provided as supplementary to the usual fluid pressure brakes, the fluid pressure brakes only should be applied when effecting service applications of the brakes, but when emergency applications are effected then both the fluid pressure brakes and the magnetic track brakes should be applied.

When the train has been brought to a stop due to the combined braking effort of the fluid pressure and magnetic track brakes, if the magnetic track brake devices remain energized excessive heating may result and the windings of these devices may be burnt out. In order to avoid this it is desirable that the magnetic track brake devices be deenergized at or about the time the train is brought to a stop.

With the foregoing considerations in mind, it is a principal object of the present invention to provide a magnetic track brake system which may operate in conjunction with a fluid pressure brake system, and in which the fluid pressure brakes only are applied during service applications, and in which both the fluid pressure brakes and the magnetic track brakes are concurrently applied in emergency applications, with the magnetic track brakes automatically cut out of action at or near the end of the stop.

In the most modern type of high speed trains, the propelling means comprises electric motors which receive electric power from an engine driven generator on the train. The engine which drives the generator is usually operated at some fairly high constant speed during the operation of the train. When the driving motors are disconnected from the generator, it is customary to reduce the speed of the engine to an idling speed. However, if the track brake devices are energized from the generator, as I contemplate doing, the engine speed should be maintained reasonably high so as to produce sufficient power for operating the magnetic track brakes efficiently.

It is, therefore, a still further object of the present invention to provide a brake equipment of the type hereinbefore referred to, in which upon disconnecting the driving motors from the generator and applying the magnetic track brakes, a means is automatically operated to insure that the speed of the generator engine will be maintained high enough so that the track brake devices will be sufficiently energized to produce the necessary braking.

Other and more specific objects of the invention, dealing particularly with the construction and arrangement of parts, will be more fully understood from the following description of an embodiment of the invention which is illustrated in the single figure of the attached drawing. This figure shows the adaptation of the invention to the head end or power car in a train, but the adaptation of the invention to a full train of cars will be apparent to those skilled in the art.

Considering briefly at first the parts of the embodiment illustrated, a single magnetic track brake device is shown at 10, a raising cylinder at 11 for raising the track brake device 10 above a track rail, and a magnet valve device at 12 for controlling the supply of fluid under pressure to and its release from the raising cylinder 11. A relay 13 controls the energization of both the track brake device 10 and the valve device 12, while a timing relay 14 controls the duration of application of the magnetic track brakes by controlling energization of the relay 13.

The source of electric power for the magnetic track brake devices is a generator diagrammatically indicated at 15 as driven by an engine 16. The generator 15 is also adapted to supply power to the driving motors of the vehicle diagrammatically indicated at 17 by an armature and field winding. A motor controller 18 controls the supply of power to the driving motors. The engine 16 is preferably of the internal combustion type, whose speed is controlled by the position of a throttle 19.

Interlocking the magnetic track brake system with the fluid pressure brake system are two fluid pressure operated switch devices 20 and 21.

Considering now more in detail the devices above enumerated, the track brake device 10 may be of any of the conventional types, and preferably has projecting upwardly therefrom a lug 23 to which is secured one arm of a bell crank lever 24. The bell crank lever 24 is preferably pivotally mounted at 25 to some portion of the vehicle truck. The other arm of the bell crank lever is connected to the stem of a piston 26 disposed in the raising cylinder 11.

The raising cylinder 11 is provided with a chamber 27 in which the piston 26 is disposed, and is so arranged that so long as fluid pressure is maintained in the chamber 27 the piston 26 will be biased to the left and thus cause the track brake device 10 to be held suspended above the track rail. When fluid under pressure is released from the chamber 27, the track brake device will drop to engagement with the rail due to the force of gravity alone.

The magnet valve device 12 is embodied in a casing having disposed therein a double beat valve 28, which is urged toward an upper seated position by a spring 29. An electromagnet 30 in the upper part of the valve device casing functions when energized to shift the double beat valve to its lower seated position. When the double beat valve is in its upper seated position, as illustrated, a communication is established between a supply reservoir 31 and the raising cylinder chamber 27, by way of pipe 32, past the open lower seat of the double beat valve 28, and pipe 33. When the double beat valve 28 is in its lower seated position, this communication is cut off and communication is established between the raising cylinder chamber 27 and the atmosphere, by way of pipe 33, past the open upper seat of the double beat valve, and an exhaust port 34.

The electric relay 13 comprises a winding or solenoid 36, which is operable when energized to actuate upwardly a stem 37. Carried by and insulated from the stem 37, and from each other, are two contact members 38 and 39. When the winding 36 is deenergized the contact members 38 and 39 are positioned as shown, but when the winding 36 is energized the contact member 38 is caused to engage stationary contacts 40 and the contact member 39 is caused to engage stationary contacts 41. This relay is preferably of the slow release type, for a reason which will be apparent later.

The timing relay 14 comprises a winding or solenoid 42 which is effective when energized to actuate upwardly a stem 43. Carried by and insulated from this stem is a contact member 44. When the winding 42 is deenergized this contact member is positioned as shown, but when the winding 42 is energized the contact member 44 is caused to move upwardly and engage stationary contacts 45.

The two fluid pressure operated switch devices 20 and 21 comprise essentially like parts, each being embodied in a casing having contained therein a piston 47, which is subject on its lowermost side to the pressure of fluid in chamber 48 and on its uppermost side to pressure of spring 49. Attached to the piston 47 is a stem 50 which carries insulated therefrom a contact member 51. This contact member is adapted to engage stationary contacts 52. As will be observed, in the case of the switch device 20 the contact member 51 engages the stationary contacts 52 only when the piston 47 is in its lower position, while in the case of the switch device 21 the reverse is true, that is, the contact 51 engages the contacts 52 only when the piston 47 is in its upper position.

Both the pneumatic switch devices 20 and 21 are connected to a pipe 54 which forms a part of the fluid pressure brake system (not shown), and to which fluid under pressure is supplied only when an emergency application of the brakes is effected. The functioning of the fluid pressure brake system in connection with the magnetic brake system disclosed is fully set forth and claimed in the parent application, Serial No. 120,385, referred to at the beginning of the specification.

The vehicle driving motor 17 has been indicated in diagrammatic form only as representative of a number of such motors which may be employed. Similarly, the engine 16 has been also indicated diagrammatically only and may be considered as having a carbureter, or other fuel feeding device 55, which is operated upon movement of the throttle 19.

As shown, the throttle 19 is a lever pivotally mounted at 56 to some stationary part, and having a handle 57 which is movable between three positions, designated as "Idle" and by the numerals 1 and 2. The throttle is connected to the carbureter 55 by a rod 58 which has secured thereto and movable therewith a highly magnetic member 60. Concentrically disposed with respect to this member 50 is a solenoid 61 which is so mounted as to remain in the position illustrated. The purpose of this arrangement will be more fully set forth hereinafter.

The motor controller 18 may be considered to be of conventional design, as the details of this device are not an essential part of the present invention. The motor controller is provided with an operating handle 62, for the operation thereof by the operator in the usual manner.

The operation of this embodiment of my invention is as follows:

*Operation*

When the vehicle is running under power the brake valve or brake controller (not shown) is maintained in the release position. As a consequence, the pipe 54 which forms a part of the fluid pressure brake system is at atmospheric pressure and the parts of the two switch devices 20 and 21 are positioned as shown. At the same time, the reservoir 31 is maintained charged with fluid under pressure in the manner illustrated in the parent application referred to.

With the brakes thus released power may be supplied from the generator 15 to the driving motor 17 by way of conductor 63, the power controller 18, conductor 64, and contacts 51 and 52 of switch device 20. It will be observed that the generator is shown as having one terminal grounded, as is also true of the driving motor 17.

Since the contacts of the switch device 21 are now open, both of the relays 13 and 14 will be deenergized, and the track brake device 10 will be held suspended above the track rail as will be obvious from the position of the parts illustrated.

Assuming now that an emergency application of the brakes is effected, fluid under pressure will be supplied to the pipe 54 and will flow therefrom to both of the switch devices 20 and 21. Fluid under pressure supplied to the switch device 20 will cause the piston 47 therein to move upwardly and thus disengage contact 51 from contacts 52. This will open the circuit between the controller 18 and the driving motor 17, in case this has not already been done by movement of the controller handle 62 to the off position. At any rate it prevents further supply of power to the driving motor.

Fluid under pressure supplied to the switch device 21 will cause engagement of contact 51 with contacts 52 of this device. This will connect the timing relay 14 to the driving motor 17, which will now operate as a generator, due to the fact that it is driven by the momentum of the vehicle, and electric power will thus be supplied to the timing relay 14. This relay will then quickly cause its contact member 44 to engage stationary contacts 45. This will in turn energize the relay 13 from a battery 66, by way of the circuits illustrated. Relay 13 will then cause contact 38 to engage stationary contacts 40, and contact 39 to engage stationary contacts 41.

When the contact 38 engages the contacts 40 the track brake device 10 is connected to the generator 15, over a circuit which includes conductors 63 and 67, contacts 38 and 40, and conductor 68, the return connection being by way of the ground conductor 69. At the same time, engagement of contact 39 with contacts 41 establishes a circuit from the battery 66 to the electromagnet 30 of the magnet valve device 12, over a circuit which includes conductor 70, contacts 39 and 41, and conductor 71, the return connection being by way of ground conductor 72. The double beat valve 28 in this magnet valve device will be then shifted to its lower seated position, thus releasing fluid under pressure from the raising cylinder chamber 27, and permitting the track brake device 10 to drop to engagement with the track rail. The track brakes will be thus fully applied.

Now when energy is being supplied to the driving motor the throttle 19 is maintained in some advanced running position, as that indicated. When, however, the supply of energy to the driving motor is cut off it is customary to move the throttle 19, either manually or by automatic means, to an idling position, so as to not waste engine fuel needlessly. However, when the timing relay 14 closes its contacts 44 and 45, the solenoid 61 is energized, by way of conductor 73. The purpose of energizing this solenoid is to insure that the throttle 19 is positioned so as to keep the engine running at a speed high enough for the generator 16 to deliver the necessary energy for operating the track brake devices throughout the train.

When the solenoid 61 is energized the core 60 is attracted inwardly thereof, regardless of to which side of the solenoid the core happens to be initially, and when the core comes to rest centrally of the solenoid, as it will due to the action of the magnetic forces present, the engine throttle 19 will be in a position to operate the engine and generator at a speed sufficiently high to meet the requirements of the track brake devices, and yet at a speed which is economical.

As the speed of the vehicle, or train, diminishes to some low value, due to the application of the brakes, the voltage delivered by the driving motor 17 will at some low speed be insufficient to maintain the timing relay 14 energized. This relay will then open its contacts 44 and 45, which will in turn deenergize the application relay 13. The application relay is, however, a slow release type of relay, that is, a definite interval of time will elapse before this relay will open its two sets of contacts. When, however, the two sets of contacts do open the circuit to the track brake device 10 will be interrupted, and similarly, the magnet valve device 12 will be deenergized. As a result fluid under pressure will again be supplied to the raising cylinder 11 to raise the track brake device above the track rail. This will result in a complete release of the magnetic track brakes.

At the same time, deenergization of the timing relay 14 also deenergizes the solenoid 61, so that the engine speed may be adjusted, either by automatic means or by manual manipulation of the throttle 19. The delay provided by the application relay 13 permits the track brake devices to be deenergized at the low engine speed, which reduces contact arcing and the danger of high induced voltages within the track brake device.

Due to the fact that the track brake devices are deenergized at or just prior to the time the train is brought to a stop, it will be apparent that the fluid pressure brakes will be relied upon to insure that the train is brought to rest and held there.

It will thus be apparent from the foregoing description that I have provided a magnetic track brake system whose operation is adapted to be initiated as a result of the application of an associated fluid pressure brake system, and which is so interlocked with the source of current supply on the vehicle or train as to insure that sufficient power will be delivered to effectively apply the magnetic track brakes whenever an application of these is initiated. It will also be apparent that the arrangement shown provides for a complete release of the magnetic track brakes at or near the end of the deceleration period, with the track brake devices deenergized at the most favorable time for minimizing danger due to arcing at contacts or danger due to high induced voltages.

While I have illustrated my invention by one specific embodiment thereof, it is not my intention to be limited to the precise details of this embodiment, or otherwise than according to the spirit and scope of the appended claims.

Having now described my invention, what I claim as new and desire to secure by Letters Patent, is:

1. In a train brake system, in combination, a vehicle driving motor, a generator, an engine for driving said generator, said engine having a control element positionable to cause said engine to be driven at a selected speed, a track brake system, means for effecting the operation of said track brake system from electric power delivered by said generator, and means operated upon the supply of electric power to said track brake system for controlling the position of said control element.

2. In a vehicle brake system, in combination, a vehicle driving motor, a generator, an engine for driving said generator, means for supplying electric power from said generator to said motor to propel the vehicle, a magnetic track brake system, means operated upon effecting an application of the brakes for disconnecting said driving motor from said generator and for delivering electric energy from said generator to said track brake system, to effect an application of the track brakes, and means operative when electric energy is delivered to said track brake system for controlling the speed of operation of said engine.

3. In a vehicle brake system, in combination, a generator, an electric brake device, means for effecting a supply of electric energy from said generator to said brake device to produce a braking effect, and means operable by said last means for controlling the speed of operation of said generator to vary the output thereof.

4. In a vehicle brake system, in combination, a generator, an electric brake device, means for effecting a supply of electric energy from said generator to said brake device to produce a braking effect, and means operable by said last means for controlling the speed of operation of said generator to vary the output thereof, and operable to reduce the speed of the generator before terminating the supply of electric energy to said brake device.

5. In a vehicle brake system, in combination, an electric generator, an electric brake device, means for effecting a supply of electric energy from said generator to said brake device to produce a braking effect, means operable at a predetermined low vehicle speed to terminate the supply of electric energy to said electric brake device and to at the same time adjust the speed of operation of said generator, and means for delaying the termination of supply of energy to said electric brake device until the speed of said generator will have been adjusted.

6. In a vehicle brake system, in combination, a vehicle driving motor adapted to be operated as a generator by momentum of the vehicle, an electric brake device, an engine, a generator driven by said engine, and means controlled by voltage delivered by said motor while operating as a generator for supplying electric energy from said engine driven generator to said electric brake device.

7. In a vehicle brake system, in combination, a generator adapted to be operated at variable speeds, an electric brake device, a relay of the slow release type for controlling the supply of electric energy from said generator to said brake device, and means for controlling the duration of energization of said electric relay.

8. In a vehicle brake system, in combination, an electric generator adapted to be driven at variable speeds, an electric brake device, a relay of the slow release type for controlling the supply of electric energy from said generator to said electric brake device, and means for controlling both the energization of said relay and the speed of operation of said generator.

9. In a vehicle brake system, in combination, an electric generator, an engine for driving said generator, said engine being operable at different speeds, an electric brake device, a relay controlling a circuit from said electric generator to said electric brake device, means for controlling the speed of operation of said engine, and means operable in response to the speed of the vehicle for controlling said relay and said engine speed control means.

10. In a vehicle brake system, in combination, an electric generator, an engine for driving said generator, a magnetic track brake device, means for controlling the raising and lowering of said track brake device from and toward a track rail, a relay of the slow release type for controlling the supply of electric energy from said generator to said track brake device and for also controlling the raising and lowering means, a vehicle motor, and a second relay controlled by said vehicle motor for controlling said first relay and the speed of operation of said engine.

11. In a vehicle brake system, in combination, an electric brake device, a generator, an engine for driving said generator at variable speeds, a throttle for controlling the speed of operation of said engine, an electrical device for adjusting the position of said throttle to adjust the speed of operation of said engine to a predetermined speed, means for effecting a supply of electric energy from said generator to said electric brake device, and means operable simultaneously with the supply of electric energy to said brake device for effecting the energization of said electrical device to adjust the speed of said engine to said predetermined speed.

12. In a vehicle brake system, in combination, a magnetic track brake device, electroresponsive means for controlling the raising and lowering of said track brake device from and toward a track rail, an electric generator, a variable speed engine for driving said generator, a vehicle driving motor adapted to be operated as a generator by momentum of the vehicle, a relay of the slow release type for controlling the supply of electric energy from said engine driven generator to said magnetic track brake device and for also controlling the operation of said electroresponsive raising and lowering means, control means for controlling the speed of operation of said engine, and a relay controlled by said vehicle motor for controlling both said slow release relay and said control means.

ELLIS E. HEWITT.